(No Model.)  2 Sheets—Sheet 1.

B. T. LOOMIS.
FILTER.

No. 342,755. Patented May 25, 1886.

WITNESSES:
Bend. F. Boyden
Wilson Ringle

INVENTOR:
Benjamin T. Loomis
By G. A. Boyden
Attorney.

(No Model.) 2 Sheets—Sheet 2.

B. T. LOOMIS.
FILTER.

No. 342,755. Patented May 25, 1886.

WITNESSES:
Bnd. H. Boyden.
Wilim Ringle.

INVENTOR:
Benjamin T. Loomis
By G. H. Boyden
Attorney.

UNITED STATES PATENT OFFICE.

BENJAMIN T. LOOMIS, OF BALTIMORE, MARYLAND.

FILTER.

SPECIFICATION forming part of Letters Patent No. 342,755, dated May 25, 1886.

Application filed December 8, 1884. Serial No. 149,786. (No model.)

*To all whom it may concern:*

Be it known that I, BENJAMIN T. LOOMIS, a citizen of the United States, residing at Baltimore, in the State of Maryland, have invented certain new and useful Improvements in Filters, of which the following is a specification, reference being had to the accompanying drawings.

My invention relates to improvements in filters, and the objects of which are, first, to bend the connecting-pipes to avoid using pipe-fittings; second, constructing the casings of the cocks integral, thereby making fewer joints; third, certain constructions of the heads and intervening ring which cheapens and simplifies them; fourth, having an intervening cutting-plate which will permit the filtering material to pass through, and which will cut or disintegrate the refuse from the water which forms in a pulp on top of the filtering material; fifth, having the inner top diameter of the cylinder which forms the casing larger than the inner lower diameter, thereby wedging the filtering material when the water is being filtered, and vice versa when cleansing the material; and, sixth, arranging the clamping-rods to secure the legs of the filter thereto, the whole to be fully described in detail hereinafter. I attain these objects by mechanism illustrated in the accompanying drawings, in which—

Figure 1:
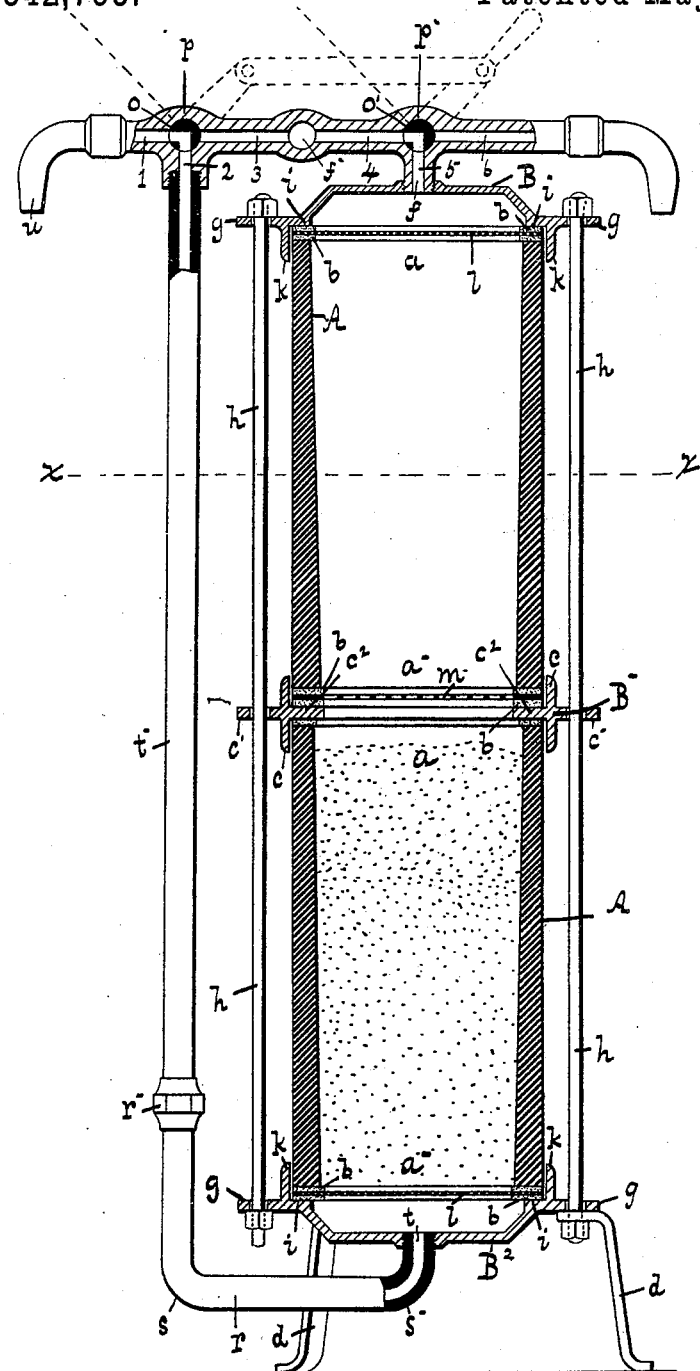
Figure 2:
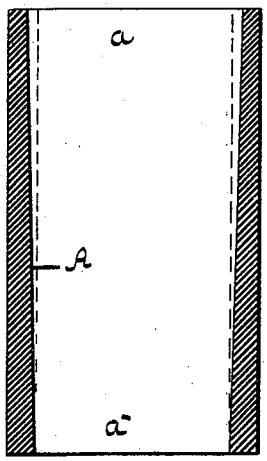
Figure 3:
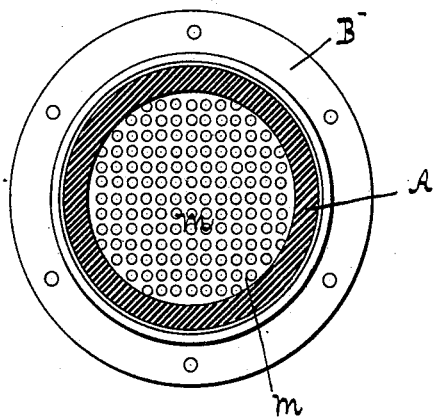
Figure 4:
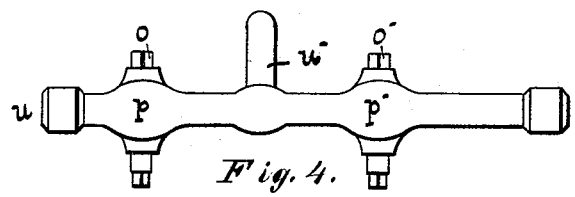
Figure 5:
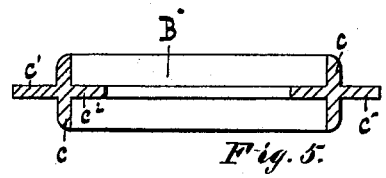
Figure 6:
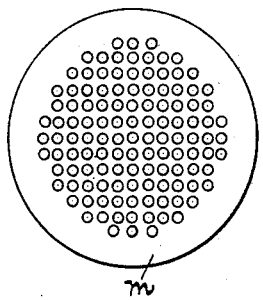

Figure 1 is a vertical section view through the device; Fig. 2, a separate sectional view of the casing; Fig. 3, a cross-section of the filter on line $x\ x$; Fig. 4, a top view of the cocks; Fig. 5, a section view of the central clamping-ring; Fig. 6, a top view of the central cutting-plate, and Fig. 7 a view showing the position of the refuse matter in relation to the filtering material when filtering.

Similar letters refer to similar parts throughout the several views.

Figure 7:
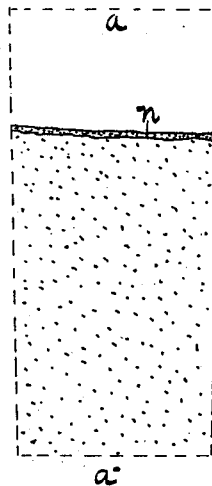

The letter A designates the casings, which may be made of glass, metal, or any suitable material, and is formed with the inner upper diameter, $a$, larger than the inner bottom diameter, $a'$, by which the filtering material is wedged together when the pressure of the water forces it downward, and which is when the water is being filtered, thus closely packing the filtering material and preventing the smaller particles of the refuse from passing through it, and when the current of the water is reversed to cleanse the filtering material is easier lifted and separated, and, also, as the particles are thereby wedged together, when filtering they form an arch which greatly lessens the strain on the bottom screen caused by the water pressing the material thereon, thus preventing the screen from being bursted or damaged. The upper head, B, is provided with a post, $f$, for the ingress and egress of the water, an outward-projecting flange, $g$, having holes for the rods $h$, a seat, $i$, and a downward-projecting flange, $k$, which overlaps the casing A. The lower head, $B^2$, being a fac-simile of the upper one, a repetition of the description is unnecessary. The center ring, B', consists of a cylindrical ring, $c$, provided with an inward-projecting flange, $c^2$, an outward-projecting one, $c'$, and suitable holes for the rods $h$ to pass through. Intervening between the heads B and $B^2$ and the ends of the casings A are fine screens $l$, (which confine the filtering material in the casing,) provided with rubber gaskets $b$, which make fluid-tight joints. The perforated plate $m$ may be constructed of any suitable material, with the perforations of any form, but sufficiently large to allow the filtering material to pass through, or a screen may be used, the same being placed about the middle of the chamber, and, as shown, is provided with gaskets $b$, and clamped between the end of the casings A and the inner flange of the ring B', thereby securely holding it in its place. The function of the perforated plate is to cut or disintegrate those portions of the refuse which forms in a pulpy sheet on the filtering material, as shown in Fig. 7, by the said filtering material passing through it and the openings in the plate $m$ into the chamber above, thereby piercing and separating the said pulp, which, if not separated, rises and lodges against the top sieve, which prevents the filtering material from being cleansed and the pulp from being ejected. The rods $h$ extend from head to head, passing through the holes in the ring B', and are provided with suitable nuts by which the different parts of the filterer are clamped and held securely together. The legs $d$ are attached to the filterer by the rods $h$ passing through and securely clamping them to the flange of the lower head, $B^2$, which makes a cheap, simple, and convenient arrangement. The cocks $p$ and $p'$ consist of ordinary two-way keys, $o$ and $o'$, having their casings integral or in one piece, which is provided with an inlet-port, $f'$, and passage-ways 1, 2, 3, 4, 5, and 6, 1 leading to the service-pipe, 2 connected with the head $B^2$, 5 leading to the head B, and 6 the discharge-port when cleansing the filterer. To the keys $o$ and $o'$ are attached levers which are connected together by a rod, by which they are made to operate in unison, and are shown by dotted lines in Fig. 1. The pipe $r$ is bent at $s$ and $s'$, which does away with fittings, thereby avoiding leaks, connections, &c., with one end connected to the port $t$ in the head $B^2$, the other end being provided with a union, $r'$, by which it is attached to the vertical connecting-pipe $t'$, with its end attached to the passage-way 2 in the casing of the cocks, the whole forming a cheap, simple, and practical arrangement not liable to leak or to get out of order.

The operation is as follows: As shown in Fig. 1 in the drawings, the keys $o$ and $o'$ are in the position as when filtering. The supply or service pipe $u'$ being connected to the port $f'$, from which the fluid passes through the ports 4 and 5, and the key $o'$ to the chamber of the filterer, passing down through the filtering material and out at the port $t$ in the head $B^2$, thence through the pipes $r$ and $t'$ to the service-pipe $u$ through the key $o$. When the filtering material has accumulated sufficient refuse, the position of the keys $o$ and $o'$ are reversed by moving the levers (shown by dotted lines) back at right angles to the position previously occupied, which directs the water from the port $f'$ to the bottom head, $B^2$, by way of the pipes $t'$ and $r$, which lifts the filtering material, and forcing the pulp $n$ up against the cutting or perforated plate $m$, and the holes in same being sufficiently large permits the filtering material to pass through, thus piercing the said pulp and separating or disintegrating it, which is then freely ejected through the top screen, $l$, with the other refuse matter and thrown out by the way of the ports 5 and 6, the key $o'$ then being in a position to form a passage therethrough. While the current of the fluid is in the latter direction the filtering material is continually thrown up and agitated, thus thoroughly washing and cleansing it. After the same has been accomplished the levers are thrown back to their former position and the process of filtering continued, as before stated.

Having fully described my invention, what I claim, and wish to secure by United States Letters Patent, is—

1. In a filter, the combination of the heads B and $B^2$, the connecting-ring $B'$, the casings A A, and an intervening partition or screen, $m$, provided with openings which are sufficiently large to permit the particles of the filtering material to pass through, and which will cut or disintegrate the pulpy mass formed when filtering from the refuse of the water, whereby the same may be quickly and thoroughly removed.

2. In a filter, the combination of the casing A, the cutting or disintegrating plate $m$, arranged in the said casing, and the filtering material arranged to be passed through the cutting-plate by the action of the water, whereby any residue or pulpy matter that may have accumulated on the filtering material when filtering is disintegrated, by which it is freely discharged and the said filtering material thoroughly cleansed.

3. In a filter, the chamber that contains the filtering material having its upper area larger than its lower one and provided with screens at either end, in combination with the filtering material, the latter so arranged that a sufficient space exists between it and the upper screen when filtering, whereby the filtering material is closely packed when filtering, and when cleansing is easily lifted and sufficient space afforded to throw up and thoroughly cleanse the same, as herein shown.

4. In a filter, the combination of the heads B and $B^2$, provided with outward-projecting flanges $g$, the flange $k$ at right angles thereto, and the seat $i$, the casing A, the screens $b$, clamped between the casing A and the seat $i$, and the clamping-rods $h$, arranged to extend from the top of the filter to the bottom and project beyond the flange $g$ and clamp the legs of the filter thereto, by which the clamping-rods hold all parts together.

In testimony whereof I affix my signature in presence of two witnesses.

BENJAMIN T. LOOMIS.

Witnesses:
G. A. BOYDEN,
WM. B. NELSON.